United States Patent
Ressel et al.

(10) Patent No.: US 10,871,020 B2
(45) Date of Patent: *Dec. 22, 2020

(54) METHOD FOR OPERATING A BUILDING CLOSURE

(71) Applicant: OVERHEAD DOOR CORPORATION, Lewisville, TX (US)

(72) Inventors: Willi Ressel, Wittenberg (DE); Christian Dietz, Wipperfürth (DE)

(73) Assignee: Overhead Door Corporation, Lewisville, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/840,356

(22) Filed: Aug. 31, 2015

(65) Prior Publication Data

US 2015/0368954 A1 Dec. 24, 2015

Related U.S. Application Data

(63) Continuation of application No. 13/304,855, filed on Nov. 28, 2011, now Pat. No. 9,121,216.

(30) Foreign Application Priority Data

Jul. 18, 2011 (DE) .................. 10 2011 107 866

(51) Int. Cl.
*E06B 3/00* (2006.01)
*E05F 15/603* (2015.01)
(Continued)

(52) U.S. Cl.
CPC ............ *E05F 15/603* (2015.01); *E05F 15/70* (2015.01); *E05F 15/73* (2015.01); *E05F 15/77* (2015.01);
(Continued)

(58) Field of Classification Search
CPC ..................... E05F 15/70; E05Y 2400/32
See application file for complete search history.

(56) References Cited

U.S. PATENT DOCUMENTS 3,755,727 A * 8/1973 Schifalacqua ............ H02P 8/32
318/466
4,289,995 A * 9/1981 Sorber .................. E05F 15/611
318/262

(Continued)

FOREIGN PATENT DOCUMENTS

DE 9207371 U1 9/1992
DE 69109174 T2 8/1995
(Continued)

OTHER PUBLICATIONS

German Office Action issued in Appln. No. 102011107867.7 dated Apr. 18, 2012 and response filed Nov. 5, 2012.
(Continued)

*Primary Examiner* — Jerry E Redman
(74) *Attorney, Agent, or Firm* — Haynes and Boone, LLP

(57) ABSTRACT

A method for operating a building closure is disclosed. The building closure may be in the shape of a sectional door or a garage door. The position of the building closure and a motor current of a drive device is monitored by a control apparatus. When the building closure stands still, an electrical drive device arrests the building enclosure by providing an electrically conducting connection between winding of the drive device to ground. The position detection device continues to monitor a signal change such that in response to the signal change, the arresting is suspended and the electrical drive device is at least partially energized.

13 Claims, 4 Drawing Sheets

(51) Int. Cl.
  *E05F 15/70* (2015.01)
  *E05F 15/73* (2015.01)
  *E05F 15/77* (2015.01)
  *G01D 5/00* (2006.01)

(52) U.S. Cl.
  CPC .......... *G01D 5/00* (2013.01); *E05F 2015/763* (2015.01); *E05Y 2400/32* (2013.01); *E05Y 2900/106* (2013.01)

(56) References Cited

U.S. PATENT DOCUMENTS

| | | | |
|---|---|---|---|
| 5,016,391 A | 5/1991 | Miller et al. | |
| 5,230,179 A * | 7/1993 | Richmond | E05F 15/643 49/28 |
| 5,281,956 A | 1/1994 | Bashark | |
| 5,444,440 A * | 8/1995 | Heydendahl | E05B 47/00 340/5.3 |
| 5,780,987 A * | 7/1998 | Fitzgibbon | E05F 15/668 318/16 |
| 5,929,580 A * | 7/1999 | Mullet | H02H 7/0851 160/292 |
| 6,172,475 B1 * | 1/2001 | Fitzgibbon | E05D 15/38 318/266 |
| 6,373,214 B1 * | 4/2002 | Hormann | E05F 15/70 310/68 E |
| RE37,784 E * | 7/2002 | Fitzgibbon | E05F 15/668 318/16 |
| 6,777,902 B2 * | 8/2004 | Fitzgibbon | H02P 1/44 318/266 |
| 7,017,302 B2 * | 3/2006 | Brookbank | E05F 15/668 160/191 |
| 7,187,150 B2 * | 3/2007 | Robb | G05B 19/351 318/266 |
| 7,207,142 B2 * | 4/2007 | Mullet | E05F 15/77 340/686.1 |
| 7,891,139 B2 | 2/2011 | Nagakura | |
| 8,098,030 B2 * | 1/2012 | Theile | E05F 15/603 318/265 |
| 8,169,169 B2 * | 5/2012 | Hass | E05F 15/63 318/257 |
| 9,057,217 B2 | 6/2015 | Ressel et al. | |
| 9,121,216 B2 * | 9/2015 | Ressel | E05F 15/70 |
| 2003/0178962 A1 * | 9/2003 | Fitzgibbon | H02P 1/44 318/466 |
| 2004/0244390 A1 | 12/2004 | Bashark | |
| 2005/0131332 A1 * | 6/2005 | Kelly | A61M 1/1696 604/4.01 |
| 2009/0255188 A1 * | 10/2009 | Theile | E05F 15/603 49/506 |
| 2010/0107498 A1 * | 5/2010 | Ley | E05F 15/70 49/199 |
| 2010/0319257 A1 * | 12/2010 | Taheri | E06B 9/70 49/31 |
| 2012/0206023 A1 | 8/2012 | Ressel et al. | |
| 2013/0019534 A1 * | 1/2013 | Ressel | E05F 15/70 49/358 |

FOREIGN PATENT DOCUMENTS

| | | |
|---|---|---|
| DE | 102006011305 A1 | 9/2007 |
| DE | 102006011305 B4 | 12/2009 |
| DE | 202011001537 U1 | 4/2011 |

OTHER PUBLICATIONS

Office Action issued in U.S. Appl. No. 14/740,016 dated Dec. 31, 2015, 9 pages.
Office Action issued in U.S. Appl. No. 14/740,016 dated Nov. 18, 2016, 12 pages.
Office Action issued in U.S. Appl. No. 14/740,016 dated Aug. 1, 2017, 10 pages.
Office Action issued in U.S. Appl. No. 14/740,016 dated Feb. 21, 2018, 8 pages.
Office Action issued in U.S. Appl. No. 14/470,016 dated Oct. 23, 2018, 5 pages.

* cited by examiner

METHOD FOR OPERATING A BUILDING CLOSURE

CROSS REFERENCE TO RELATED APPLICATIONS

This application is a continuation of U.S. application Ser. No. 13/304,855, filed Nov. 28, 2011, issuing as U.S. Pat. No. 9,121,216 on Sep. 1, 2015, which claims priority to German Patent Application No. DE 10 2011 107 866.9, filed Jul. 18, 2011, which are incorporated herein by reference in their entireties.

BACKGROUND

The invention relates to a method for operating a building closure having the shape of an overhead sectional door or of a garage door or the like, including a spring-loaded counterweight device and an electrical drive device, which essentially consists of an electrical motor, with or without a gear, and a position detection device, which is coupled in a compulsory manner to the electrical motor or to the gear, respectively directly or indirectly to the building closure, which position detection device is charged by an intelligent control apparatus including several programs which among others comprise a current limitation.

The document DE 101 28 257 A1 describes a door operator for elevator doors including a motor, by means of which an elevator door is displaceable along a predetermined travel distance, and describes a control, which controls the motor operation according to programs and pulses which are detected at the pulse generator of the motor. In order to reduce the expense for the starting and normal operation of the door operator, the control includes several operating conditions, in which the motor operation is variably controlled, and the control automatically switches between these conditions.

The object of the invention is to ensure that, when the electrical drive motor stands still, the actual position of the connected building closure is maintained in a long-term stable manner in both the open position and the closed position. In this case, in particular expensive solutions, such as equipping the electrical motor with an auxiliary winding and energizing the latter in the terminal positions, should be foregone. Furthermore, mechanical interlocking units are not desirable either, because they would increase the cost for such a door. It should be possible to equally employ such a solution for different door types, respectively door dimensions.

SUMMARY

According to the invention, a method for different door types and door dimensions for operating a building closure in the shape of an overhead sectional door or a garage door or the like, including a spring-loaded counterweight device and an electrical drive device is proposed. The electrical drive device is a control apparatus, which has several programs or program steps stored in a controller, in order to activate different door types and door dimensions as well as different motor types, such as three-phase current motors, or electrical motors without collectors, in particular configured as brush-less direct current motors. Parameters and the like are stored for example in EEPROMs and other non-volatile memories. A learning run is performed in order to determine the specific parameters of the corresponding building closure, and the data and parameters collected during the run are stored in memories of the control apparatus, and later serve as the reference for the subsequent operation of such a building closure. Based on the provided reference information, and in conjunction with a position detection device, it is possible to always precisely determine the position of the building closure at each location of the travel path. At the same time and depending on the position of the building closure, at least one program in the control apparatus monitors and modifies the motor current.

When the building closure reaches for example the open position, the gear motor needs to sufficiently compensate for the force resulting from the counteracting torsion spring and the counterweight. So that the building closure does not accidentally leave the open position on account of the counteracting forces, the electrical motor is arrested in this position without utilizing any mechanical means. This may be achieved by an electrically conducting connection between the terminal clamps or individual windings, respectively by electrically connecting the terminal clamps or the windings of the motor to ground. Connecting the winding phases in this manner, for example in case of a three-phase current motor, achieves arresting the motor in a current-less state in any desired position. As this switching measure occurs at the terminal clamps of the winding of the electrical motor, so to speak during the slow down, respectively the immobilization of the motor in one of the terminal positions, no excessive counteracting forces will arise, because the motor is turned-off by a fixed, load-depending motor operating value. In this case, measuring the currents is realized in that sufficient information on the occurring braking torques is known. Depending on the type of motor utilized, pulse width modulations or else phase angle controls are thus utilized for the drive device. The electrical characteristics of such a pulsed load circuit are constantly monitored by such a method, wherein such a load circuit includes at least one ohmic and one inductive component.

Thus, when the electrical motor stands still, the above mentioned method always includes automatically an electrical arresting via the terminal clamps of the winding or the like. During operation, on account of the provided information in the memory of the drive device and the data delivered by the position detection device, a precise position of the building closure is known at each location of the traveling path or at immobilization. A permanent signal monitoring at the position detection device is even performed during immobilization. In the event signal variables or signal changes would occur during this period of time at the position detection device, on account of the program control, this signal variable or signal change would neutralize the electrical arresting at the terminal clamps of the winding or the like of the electrical motor, and simultaneously effect a partial energizing of the electrical motor. In this case, the partial energizing occurs in the direction of movement opposite to the one signaled by the position detection device. Such a position detection device may be configured as an incremental encoder, or as a Hall effect sensor or as a switch, or as an ultra-sound sensor or the like.

This is for example the case in the open position of the building closure, such that, with occurring higher spring forces or other counteracting forces, where a force acts in the direction of the closed position of the building closure, the position detection device will signal this circumstance. Based on the corresponding data, the control apparatus reacts by automatically initiating a partial energizing of the drive device, such that the desired position in the open position is reached again and is kept. Once the control process of partial energizing is carried out, the partial energizing is maintained for example, if further counteracting forces are in effect at a higher value, respectively the partial energizing is suspended and simultaneously the electrical arresting is carried out again via the terminal clamps of the winding or the like of the electrical motor. Subsequently the building closure remains in the desired open position.

In the closed position in an analogous way, the closed position of the building closure is monitored. In the event an individual would attempt to push the door leaf of the building closure open by using excessive force, the position detection device would detect this action. The signals or signal changes at the position detection device activate a program, which executes the arresting by means of an electrically conducting connection between the terminal clamps or individual windings, respectively by electrically connecting the terminal clamps or the windings of the motor to ground. Once the arresting is suspended by the control apparatus according to a program, a partial energizing is maintained until the building closure remains again reliably in its desired closed position. In case no further additional counteracting forces are present, the arresting is again carried out according to the program as described above.

It should be understood that, based on differently dimensioned building closures, different values are required for such a partial energizing. However, the control apparatus automatically recognizes this status. Based on the originally performed learning run, the individual parameters are memorized for the utilized door type and the door dimension thereof. Should the memorized values prove to be insufficient, it is possible to proceed to an adaptation and modification of these values during a test run.

In order to be able to realize such arresting via the terminal clamps of the winding of the electrical motor by an electrically conducting connection between the terminal clamps or individual windings, respectively by electrically connecting the terminal clamps or the windings of the motor to ground, an electrically or mechanically switchable device may perform this action. In case of an electrical device, transistors or the like may be utilized for example. In case of mechanical devices, relays, contactors, switches or the like may be employed.

DESCRIPTION OF THE DRAWINGS

The invention will now be described in more detail, reference being made to one possible embodiment example, in which.

DETAILED DESCRIPTION

In the following description, only the open position of the building closure and the thereto program-related adjustments are considered. However, the same mode of action applies to the closed position, in which however, counteracting forces may only result from a forced, unauthorized opening attempt in the direction opposite the closed position.

Figure 1:
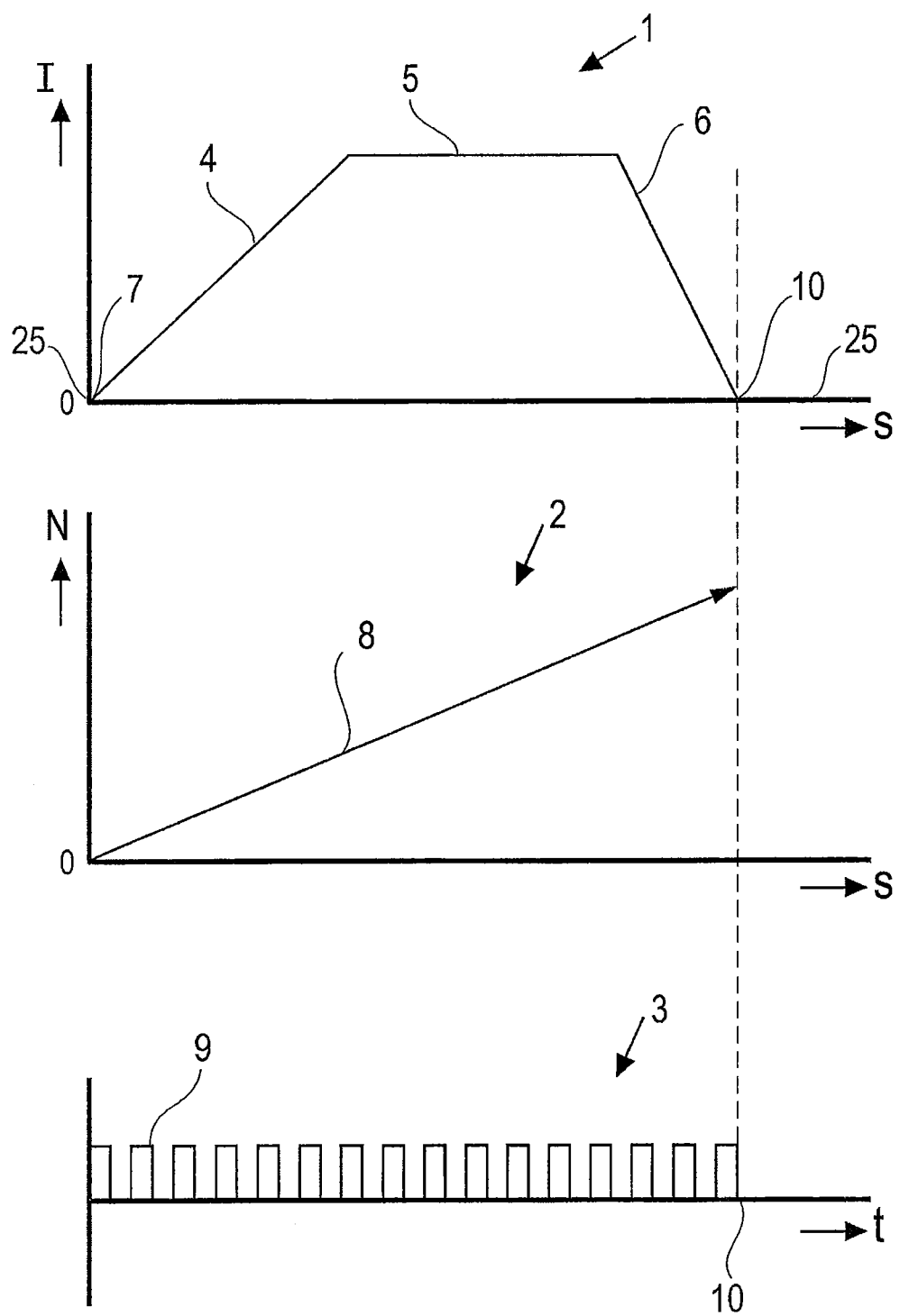
FIG. 1 shows three superimposed characteristic lines, wherein the first characteristic line represents the motor current, the second characteristic line represents the counteracting force of the spring device, and the third characteristic line represents the information of the position detection device.

The upper characteristic line of FIG. 1 shows the effective current at the drive device along the traveling path, as the motor current characteristic line 1. In this case, a soft-current start instruction 7, from the arresting position, is carried out by increasing the current, as a soft-start current 4, up to reaching the level of the desired traction current 5. Shortly before reaching the position, i.e. the building closure reaches the open position or the closed position, a program-controlled instruction is issued by the control apparatus which results in a soft-stop current 6. This soft-stop current 6 is reduced until the current reaches a level of 0 at the terminal point 10 on the motor current characteristic line 1, and simultaneously the program of the drive device 19 effects an arresting 25 via the terminal clamps of the electrical motor 24.

Below the motor current characteristic line 1, a spring force characteristic line 2 is illustrated in the second diagram. This diagram reveals that the spring force 8 continuously rises when opening the building closure, because this force is supposed to assist when closing the building closure. This diagram also reveals that the largest counteracting force for the drive device occurs in the open position of the building closure.

Below the spring force characteristic line 2, a position measuring 3 is illustrated by way of example by pulses. This diagram reveals that the pulses of the position detection device cease to exist at the terminal point 10, and that therefore the drive device issues the instruction to arrest 25 the electric motor 24.

Figure 2:
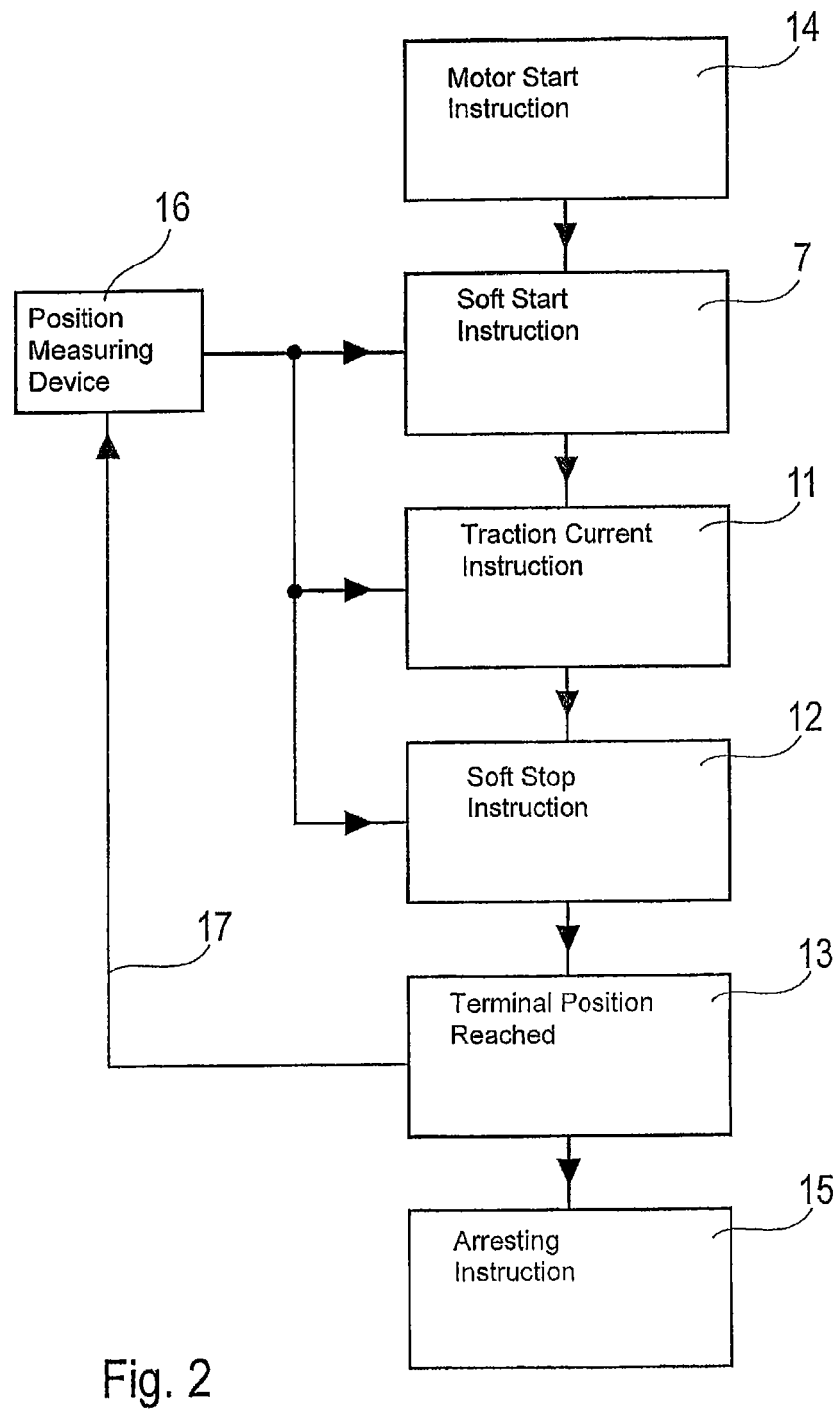
FIG. 2 shows a potential program flow chart of the currents occurring during a traveling path at the electrical motor, and therefore at the drive device.

FIG. 2 reveals the flow of the different program steps for energizing the electrical motor 24. The soft-start instruction 7 is triggered by a motor start instruction 14, and the door in the shape of the building closure opens or closes while starting to move slowly. Once the soft-start phase is terminated, the current changes to traction current 5, which is illustrated by the traction current instruction 11. Shortly before reaching the desired position (open position or closed position), a soft-stop instruction 12 is issued, which effects a reduction of the traction current 5 for the motor 24. When reaching the terminal position, an instruction 13 is issued, which effects that simultaneously an arresting instruction 15 is issued for the electrical motor 24. FIG. 2 reveals furthermore that a position acknowledgement 17 is sent to the position measuring device 16, in order to indicate that the terminal position 10 has been reached. The position measuring device 16 is furthermore connected to the soft-start instruction 7, the traction current instruction 11, and the soft-stop instruction 12.

Figure 3:
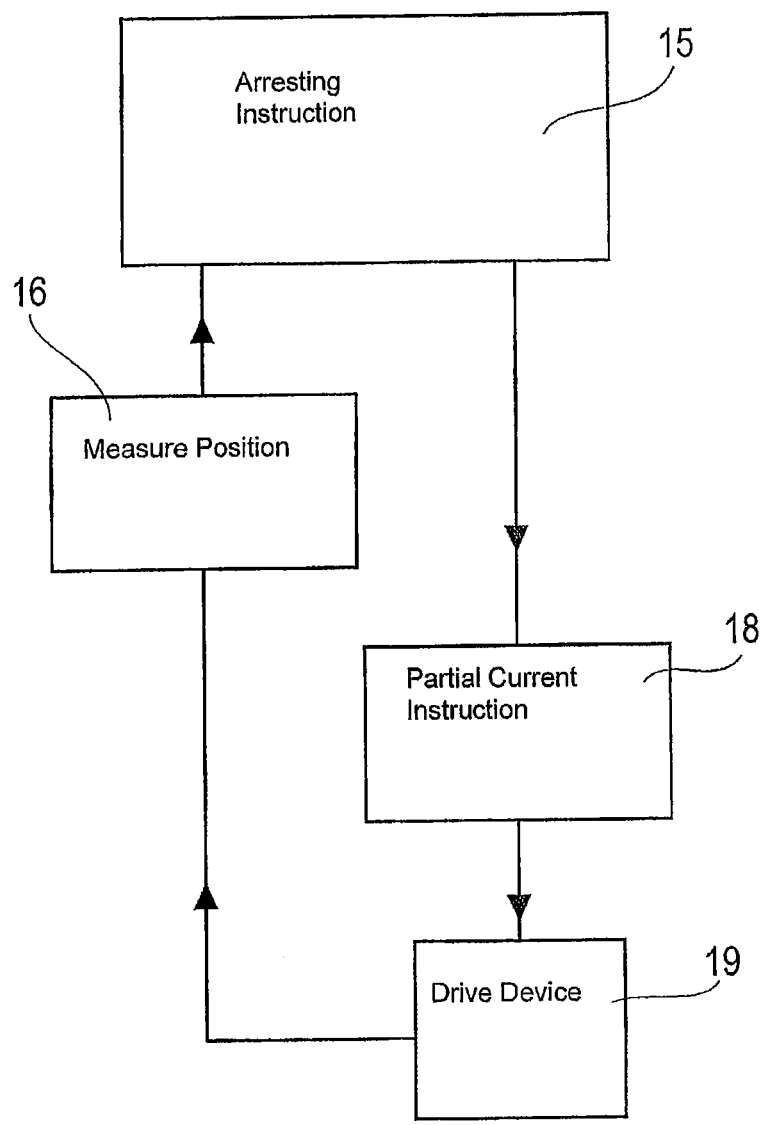
FIG. 3 shows a block diagram on the program steps, when the building closure leaves the desired position.

The diagram in FIG. 3 illustrates the situation, where, for example when measuring a position 16, the position detection device sends a modified information, because, for whatever reasons, the desired position has not been maintained. This information suspends the arresting 15 and simultaneously a partial current instruction 18 is issued to the drive device 19, which supplies the latter with a reduced current which is important enough to move again to the previously desired position, respectively it is also possible to maintain this position for a certain adjustable period of time on account of the partial current. Said information from the drive device 19 is obviously sent back to the position detection 16 such that, when reaching the desired position, the arresting 15 can be switched-on again.

Figure 4:
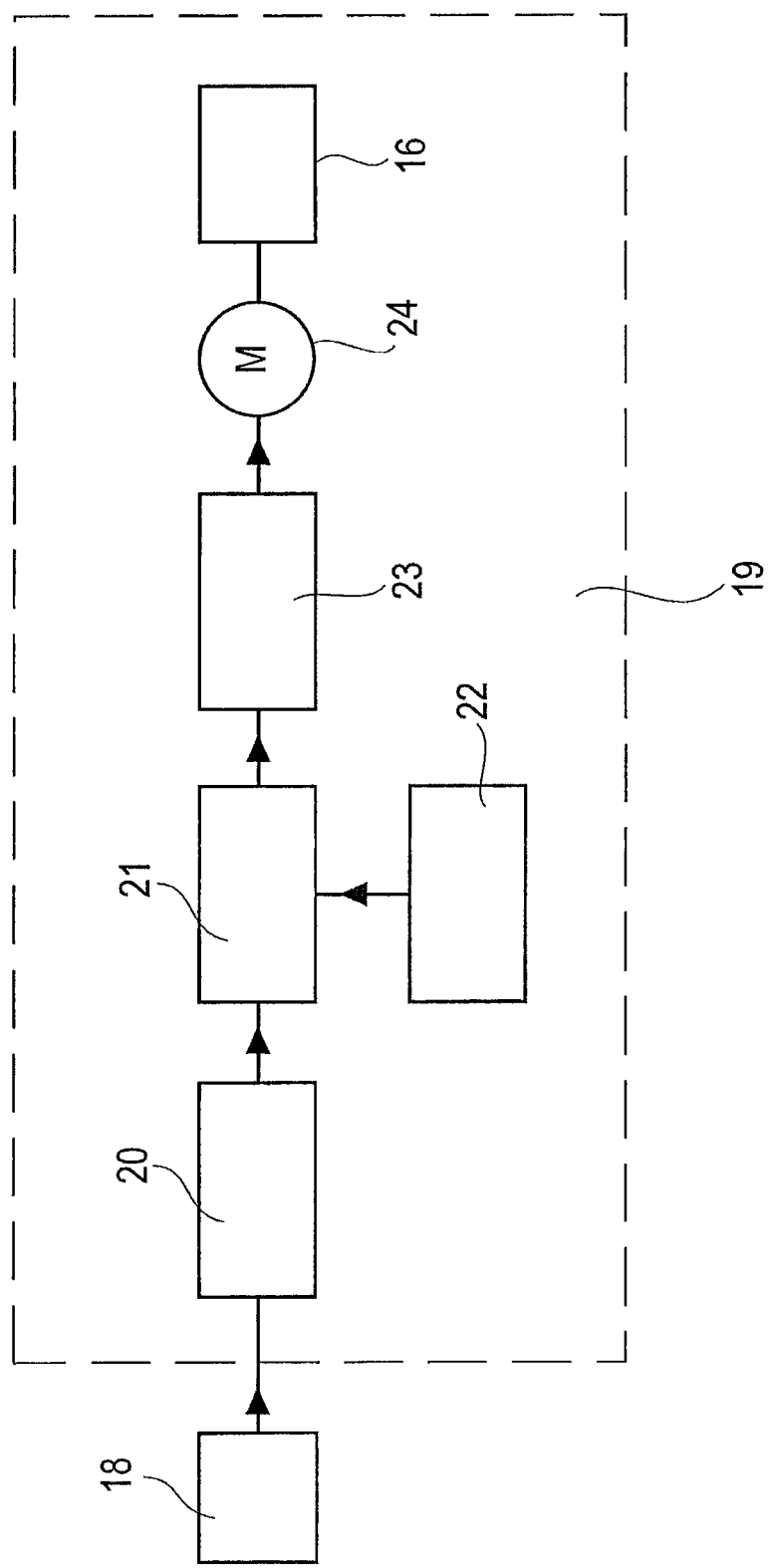
FIG. 4 shows an activation of a drive device.

FIG. 4 reveals how the electrical motor 24 is activated when the partial-current instruction 18 is issued. The instruction partial current 18 is forwarded to the control 20, which in turn forwards the activation to the power section 21. Depending on the desired position, subsequently a reversal of the direction of rotation 23 is performed such that partial current in the required travel direction is permanently supplied to the electrical motor 24. This is detected by the position measuring unit 16. At the same time, an additional current monitoring 22 is activated.

REFERENCES NUMERALS

1 motor current characteristic line
2 spring force characteristic line
3 position measuring
4 soft-start current
5 traction current
6 soft-stop current
7 soft-current start instruction
8 spring force
9 pulses
10 terminal position reached
11 traction current instruction
12 soft-start instruction
13 terminal position reached
14 motor start instruction
15 arresting instruction
16 position measuring
17 position acknowledgement
18 partial current on
19 drive device
20 activation
21 power section
22 current monitoring
23 reversal of direction of rotation
24 electrical motor
25 arresting

What is claimed is:

1. A method for operating a building closure having a motor engaged with the building closure movable between an open position and a closed position, the method comprising:
   monitoring an instant position of the building closure;
   maintaining, with the motor, the building closure at the instant position, the instant position including any position between and including the open position and the closed position;
   in response to a force acting on the building closure, detecting a displacement of the building closure from the instant position;
   determining a direction of the displacement using a position detection device, the position detection device operable to signal a first displacement direction toward the open position and a second displacement direction toward the closed position; and
   in response to a detected displacement, instructing the motor to move the building closure in a direction opposite the signaled direction of displacement to return the building closure to the instant position.

2. The method of claim 1, wherein the instant position is monitored by the position detection device coupled to the motor.

3. The method of claim 2, wherein the position detection device includes an incremental encoder.

4. The method of claim 2, wherein the position detection device includes a Hall effect sensor.

5. The method of claim 2, wherein the position detection device includes an ultrasound sensor.

6. The method of claim 1, further comprising:
   in response to returning the building closure to the instant position, arresting the motor.

7. The method of claim 1, wherein instructing the motor to move the building closure comprises providing the motor a partial current for generating a torque to move the building closure to maintain the instant position.

8. The method of claim 1, wherein the motor is a brushless direct current motor.

9. A method for operating a building closure movable between an open position and a closed position, the method comprising:
   monitoring an instant position of the building closure;
   exerting a force to hold the building closure at the instant position, wherein the force is provided from a motor and the instant position includes any position between and including the open position and the closed position;
   in response to an external force acting on the building closure, detecting a change of the instant position;
   determining a direction associated with the change of the instant position using a position detection device, the position detection device operable to signal a first direction toward the open position and a second direction toward the closed position; and
   in response to a detected change of the instant position, reversing the motor to move the building closure opposite the signaled direction of the change of the instant position.

10. The method of claim 9, further comprising monitoring the instant position by the position detection device coupled to the motor.

11. The method of claim 9, further comprising returning the building closure toward the instant position.

12. A method of continually maintaining a position of a movable barrier operable to move between a fully open position and a fully closed position, comprising:
    applying a force using a motor to immobilize the movable barrier in a known position, the known position including the fully open position, the fully closed position and any position therebetween;
    monitoring the known position of the movable barrier;
    in response to an external force acting on the movable barrier, detecting a displacement of the moveable barrier away from the known position;
    determining a direction of the displacement,
    signaling a first displacement direction toward the fully open position and a second displacement direction toward the fully closed position;
    releasing the force in response to a displacement detection;
    energizing the motor to move the movable barrier in the second direction in response to determining the first displacement direction; and
    energizing the motor to move the moveable barrier in the first direction in response to determining the second displacement direction.

13. The method of claim 12, further comprising after energizing the motor to move the moveable barrier, reapplying the force and resuming monitoring the moveable barrier for a subsequent displacement.

* * * * *